United States Patent Office 2,889,389
Patented June 2, 1959

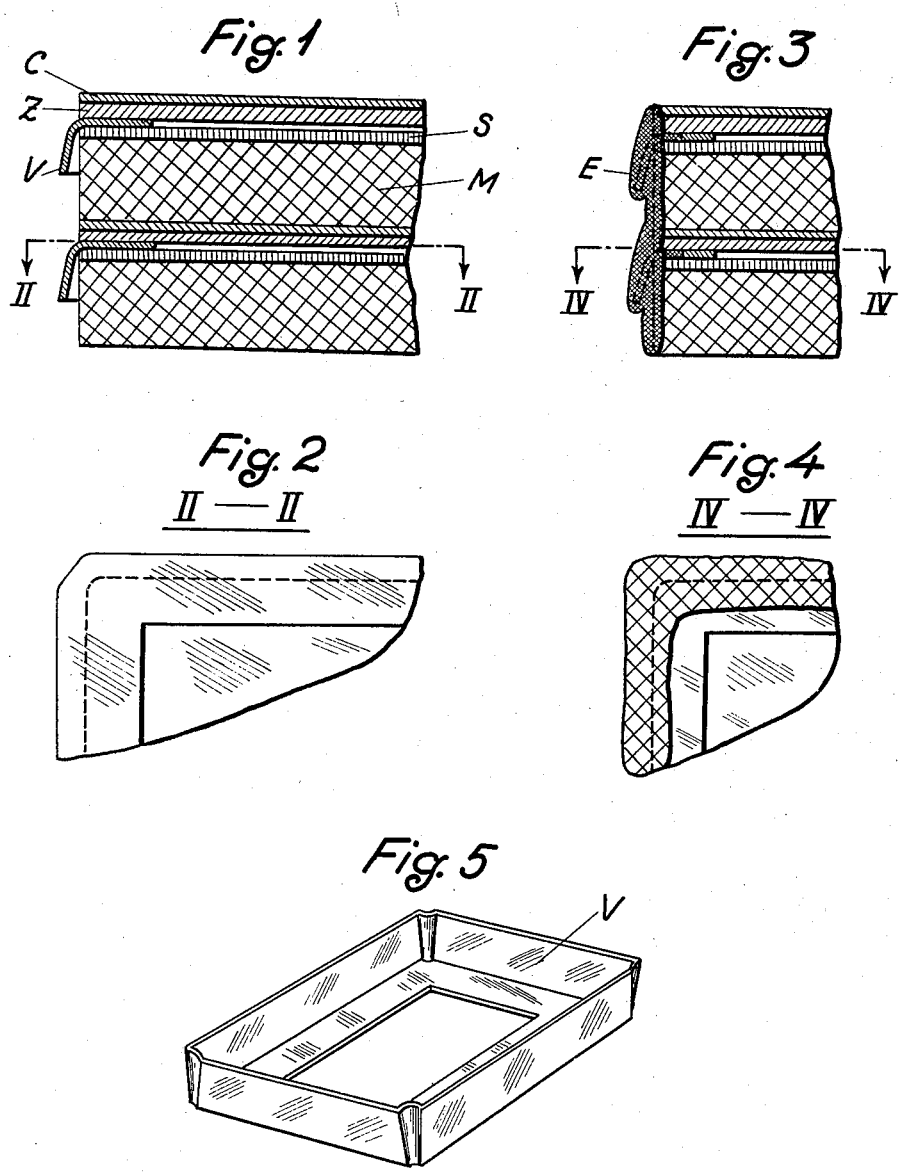

2,889,389

GALVANIC BATTERY OF THE FLAT CELL TYPE AND METHOD OF PRODUCING THE SAME

Pentti J. Tamminen, Otaniemi, Otakallio, Helsinki, Finland

Application April 26, 1955, Serial No. 503,936

Claims priority, application Finland May 18, 1954

12 Claims. (Cl. 136—111)

The instant invention relates to galvanic batteries of the type comprising bibulous, electrolyte-containing flat cell elements alternating with impervious flat electrode elements the said elements being juxtaposed face to face under pressure to form a stacked unitary assembly, wherein the different elements make contact with each other in such manner that good electrical connection is established. It is to be understood that here the term cell is used to denote a unit composed of an electrode element and a cell element. Hereinafter an electrolyte-containing cell will be termed a wet cell while a cell not yet filled with liquid will be termed a dry cell.

Heretofore, in the production of batteries of the kind stated, it has not been feasible to prevent with absolute certainty the electrolyte from oozing around the edges of the electrode elements into the adjacent cell and thereby impairing an otherwise still usable battery.

For obviating the stated defect it has been proposed, for example, to inclose the peripheral margins of all wet cells with a rubber-like elastic integument folded slightly inwardly over the edges of the elements to provide an expansion space for the electrolyte in between the elastic integument and the cell edges, after which any desired number of so isolated cells are assembled to form a stack, pressed against each other by binding and provided with an insulating outer coating either by dipping the assembly in or spraying the same with an insulation compound. The stated method has for its disadvantage that cell isolation is chiefly brought about by utilizing the tension of the elastic integument on the edges of the electrode elements and cell elements while the said material does not, literally, adhere to the same. If the elements are oblong in shape the tension will not be as effective to hold the integuments in against the longer sides of the elements as it is in holding them in against the shorter sides. Thus the portions of the integuments at about the middle of the longer sides of the elements will tend to sag away therefrom allowing the electrolyte to ooze out at such positions, causing local reactions which impair the battery.

Another disadvantage of the stated prior art battery is that internal resistance is comparatively great due to the fact that the cross sectional area of that portion of the depolarizing cake which makes contact with the electrode elements is only a fraction of the total cross sectional area of the depolarizing cake. Besides, the intercell integument occupies considerable space in the said battery.

The prior art also proposes a method according to which wet cells are arranged to form a stack and are bound together, after which the battery is coated by dipping the same into a bath of molten insulation compound and disposed within a container means into which is poured insulation compound to fill the same. In this battery, however, the cross sectional area of the electrode elements is greater than that of the depolarizer mix for permitting the insulation matter to adhere to the outstanding edges of the electrode elements and thereby provide sufficiently good insulation. Then too, in the stated type of battery the electrical output in proportion to battery volume and weight is still smaller than that in the first described battery assembly.

Among prior art batteries of the flat cell type there are also such batteries wherein the outstanding edges of the electrode elements are prior to assemblage, bent along the battery sides to form a bowlshaped electrode element. In this way it has been possible to increase the electrical output of the battery in proportion to battery volume to correspond to that of the first described battery assembly but the electrical output thereof in proportion to battery weight is smaller because only approximately 50% of the requisite metal actively partakes in the reaction wherefrom it follows that manufacturing costs in this case are higher than those of the first described battery.

In the hereinabove described battery structures the integument is impervious wherefore gas pressure may develop under certain discharging circumstances.

For eliminating hydrogen gas pressure in batteries, proposals have been made to provide the battery with a vent containing filtering material made of dense plastic filament-net, which permits hydrogen gas to pass easily therethrough but transmitting water vapor only with difficulty. For the same reason it has been proposed to make the outer battery container of dense plastic filament-net of the stated type and thereby economize on the space occupied by the vent.

The instant invention has for its object to provide effective insulation of the individual cells of a galvanic battery of the flat cell type in such manner that electrolyte leakage from one cell to another is prevented with certainty.

Another object is to provide a battery having great electrical output in proportion to battery weight and volume.

Another object is to provide methods for the producing of such batteries in an economical manner by rendering possible insulation of the whole battery in one single step for reducing manufacturing costs.

A further object is to provide insulation of the battery in dry state and thereby improve storage fitness as batteries may be stored in dry state for almost unlimited periods of time and be filled with electrolyte at the time when the same are put to use.

The invention will hereinafter be described more in detail with reference to the accompanying drawing which illustrates by way of example a battery embodying the invention.

In the drawing, Fig. 1 is a fragmentary sectional view of an assembled uninsulated battery of the type described and Fig. 2 is a sectional view taken along line II—II of Fig. 1.

Fig. 3 illustrates a battery according to Fig. 1 with insulation and

Fig. 4 is a sectional view along line IV—IV of Fig. 3.

Fig. 5 is a perspective view of one form of the integument sheet.

The battery shown in the drawing is composed of numerous cells each comprising a carbon electrode C, a zinc electrode Z, a depolarizing cake M and a flat electrolyte-containing element S. Between each negative electrode element Z and the electrolyte-containing element S an integument sheet V is positioned, and the battery is insulated by an insulation layer E.

The integument sheet V positioned in between the negative electrode element Z and the electrolyte-containing element S is, according to the invention, made advantageously of thin, porous material, for example, paper, This integument sheet may be so dimensioned that its sides extend the same distance over the sides of the electrode element, as is shown in the drawing or its dimensions may be the same as or less than those of the electrode element. The part of the integument sheet disposed within the battery may either be compact or provided with one or more openings for facilitating passage therethrough of the electrolyte to the negative electrode element (Fig. 5). When the battery is dipped in the bath of molten insulation compound the same will impregnate the edges of the battery so the surface of the negative electrode element will be effectively encircled by a peripheral border of insulation compound. This fact will become evident from Figs. 3 and 4 wherein the hatched part E designates the insulation layer. Study of the figures will show that the insulation compound penetrates into the battery the longest distance along the porous integument sheet V. The insulation compound is incapable of penetrating to any notable degree into the electrolyte-containing element S impregnated with salts and other matter necessary for the electrolyte. It is similarly incapable of penetrating into the depolarizing cake M. The insulation compound will adhere fairly well to the electrode elements Z—C because of the capillary attraction of the integument sheet. In this way the electrolyte colloid is prevented from oozing to the edges of the Zn-elements which fact, to a high degree, serves to reduce short-circuiting risks and to improve storage fitness.

On employing integument sheets larger in size than the electrode elements the sheet edges are folded, advantageously beforehand, as shown in Fig. 5 which fact serves to facilitate assemblage of the battery.

According to the invention the integument sheets may also be made of matter soluble in the molten insulation compound. Polyethylene is mentioned by way of example. Upon insulating the battery by dipping the same in some suitable mixture the edges of the integument sheet will dissolve in the insulation mixture or compound and form together therewith a compact and continuous insulating layer. It is to be understood that in this case the integument sheet must be provided with openings for passage of the electrolyte.

The assembling and insulating of the battery may advantageously be performed in the following manner.

The desired number of cells each comprising a carbon electrode C, a zinc electrode Z, a depolarizing cake M and a electrolyte-containing element S as above described are formed into a stack using integument sheets according to the invention between each zinc electrode Z and electrolyte-containing element S. The stack is inserted in a suitable bracket device, by means of which all cell elements are pressed face to face. The assembled stack is then dipped into a bath of molten insulation compound when still in the bracket device, and is immediately thereafter pressed between pairs of smooth surfaces of considerable heat capacity, whereby the insulation compound immediately cools and solidifies. At the same time a smooth and regular shape is imparted to the battery. Thereafter the end plates are inserted, and if desired, to further improve the insulation and mechanical strength of the battery, the battery may be wrapped in a thin plastic film which is secured with rubber tape or other suitable material, whereafter the battery again is dipped into molten insulation compound under vacuum. The battery being under the surface of the bath the vacuum is released, whereby a very dense and effective insulation is achieved.

The invention also contemplates assembling and insulating the battery in dry state, after which the moisture content requisite in the battery is provided, subsequently to insulation, by piercing one or more small holes through the insulating coating into each depolarizing cake whereby water may be introduced into said cake through said holes for absorption by said cake. Subsequently, said holes may be closed by rapidly redipping the battery in a bath of molten insulation compound.

It is to be understood that the battery may also be insulated in ready moistened state. In this case all the requisite liquid is confined in the depolarizing cakes while the electrode elements and the integument sheet are maintained quite dry, and the dipping of the battery into the bath of insulation compound is effected immediately after assemblage in which case the liquid will diffuse through the whole battery only after the insulation coating has been applied.

As has hereinabove been mentioned the insulation compound must be pervious to hydrogen gas but impervious to water vapor. In addition to this, a good insulation compound must be water-repellent and to some degree elastic so the same will not rupture when battery volume increases during discharge, and moreover, the same should be such as to absorb effectively into the integument sheets. For the objects of the invention a preferred insulation compound consists of a mixture of a 10% polyethene in paraffin. Naturally other insulation compounds or mixtures of compounds which fulfill the stated requirements may be used.

It is to be understood that since the embodiments contained in the above description and shown in the drawing may be widely varied without departing from the scope of the invention, the description and drawing shall be interpreted as illustrative and not in a limiting sense.

What I claim is:

1. In the production of galvanic batteries of the flat cell type formed of a plurality of cells wherein isolation of the individual cells is effected by a coating employing an insulation compound pervious to hydrogen gas but impervious to water vapor, and wherein each cell includes a cell element and an electrode element, the method which comprises, assembling an integument sheet on a face of the electrode element, assembling a separator sheet on said intgument sheet, said separator sheet formed as a separate layer, assembling said electrode and cell elements with said integument sheet and separator sheet therebetween, assembling a plurality of said cells in a stack to form a battery and insulating the whole battery and securing the same together at one time by dipping the whole of said battery in a bath of molten insulation compound pervious to hydrogen gas but impervious to water vapor and absorbing the bordering portions of said integument sheets in said compound during said dipping by bringing said bordering portions into contact with said compound, said separator sheets being incompatible with said compound.

2. The method as in claim 1 and including impregnating said bordering portions of said integument sheets by said compound while absorbing the same therein.

3. The method as in claim 1 and including dissolving said bordering portions of said integument sheets by said compound while absorbing the same therein.

4. The method as in claim 1, said bordering portions including sections extending outwardly beyond the edge of said electrode element and folding said sections to lie along the sides of the battery.

5. A method as in claim 1 and including assembling and insulating said battery while said elements are in dry state and thereafter perforating said insulation compound and introducing water into said battery through said perforations into said cells and on completion of said introducing closing said perforations by filling the same with molten compound.

6. A method as in claim 1 and including assembling an integument sheet on each face of said electrode element.

7. A method as in claim 1 and providing those parts of the integument sheets falling within the cells with an opening.

8. A galvanic battery which comprises, a plurality of flat cells, each of said cells including an electrode element and a cell element, a porous integument sheet and a separator sheet extending between each of said electrode elements and its complementary cell element, said sheets being separate elements in overlying relationship and said integument sheet having a bordering portion extending outwardly of and around the borders of said cell element, said cells being assembled in the form of a stack and a coating of an insulation compound applied to and covering the side walls of said stack and securing the cells of said stack in assembled relationship, said insulation compound being pervious to hydrogen gas but impervious to water vapor and said insulation compound covering the exposed portions of said integument sheets and said exposed portions of said integument sheets being partially absorbed by said insulation compound, said separator sheet being impervious to said insulation compound.

9. A galvanic battery as in claim 8 and further characterized by said integument sheeting being formed of porous paper.

10. A galvanic battery as in claim 8 and further characterized by said integument sheet being in the form of a shallow dish with a portion of the bottom thereof removed and with the side of said dish extending along the sides of the battery.

11. A galvanic battery as in claim 8 and further characterized by said insulation compound being a mixture of polyethylene and paraffin.

12. A galvanic battery as in claim 11 and said mixture of polyethylene and paraffin being substantially 10% polyethylene and 90% paraffin.

References Cited in the file of this patent

UNITED STATES PATENTS

| | | |
|---|---|---|
| 2,544,115 | Wagner | Mar. 6, 1951 |
| 2,583,063 | Richardson | Jan. 22, 1952 |
| 2,632,784 | Marsal et al. | Mar. 24, 1953 |
| 2,671,125 | Heraud | Mar. 2, 1954 |
| 2,705,251 | Kirkman | Mar. 29, 1955 |
| 2,705,253 | Kirkman | Mar. 29, 1955 |
| 2,774,806 | Jobe et al. | Dec. 18, 1956 |
| 2,781,414 | Ensign et al. | Feb. 12, 1957 |

FOREIGN PATENTS

| | | |
|---|---|---|
| 739,990 | Great Britain | Nov. 2, 1955 |